(12) United States Patent  
Tomono

(10) Patent No.: US 8,289,556 B2  
(45) Date of Patent: Oct. 16, 2012

(54) IMAGE PROCESSING APPARATUS

(75) Inventor: Keitaro Tomono, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 447 days.

(21) Appl. No.: 12/693,752

(22) Filed: Jan. 26, 2010

(65) Prior Publication Data

US 2010/0208292 A1    Aug. 19, 2010

(30) Foreign Application Priority Data

Feb. 18, 2009  (JP) ................................. 2009-034976

(51) Int. Cl.
*G06F 15/00* (2006.01)
*G06F 3/12* (2006.01)
*G06K 1/00* (2006.01)

(52) U.S. Cl. ........................................ 358/1.15; 358/1.1

(58) Field of Classification Search .................. None
See application file for complete search history.

(56) References Cited

U.S. PATENT DOCUMENTS

| | | | |
|---|---|---|---|
| 2002/0061206 A1* | 5/2002 | Enomoto et al. | 399/124 |
| 2007/0014615 A1 | 1/2007 | Kasayama et al. | |
| 2007/0274753 A1 | 11/2007 | Muto | |
| 2008/0074267 A1 | 3/2008 | Sugiyama | |
| 2009/0009777 A1* | 1/2009 | Miyashita | 358/1.5 |

FOREIGN PATENT DOCUMENTS

| | | |
|---|---|---|
| JP | 2003-208573 | 7/2003 |
| JP | 2006-44064 | 2/2006 |
| JP | 2006-88478 | 4/2006 |
| JP | 2006-110802 | 4/2006 |
| JP | A-2006-139631 | 6/2006 |
| JP | A-2006-343894 | 12/2006 |
| JP | 2007-007962 | 1/2007 |
| JP | 2007-164477 | 6/2007 |
| JP | A-2007-203487 | 8/2007 |
| JP | 2008-077500 | 4/2008 |
| JP | A-2008-140217 | 6/2008 |

OTHER PUBLICATIONS

Japanese Official Action dated Feb. 1, 2011 together with an English language translation from JP 2009-034976.
Official Action dated May 17, 2011 received from the Japanese Patent Office from related Japanese Application No. 2009-034976.
Decision to Grant dated Jul. 26, 2011 received from the Japanese Patent Office in JP P2009-034976, together with an English-language translation from JP P2009-034976.

* cited by examiner

*Primary Examiner* — Douglas Tran
(74) *Attorney, Agent, or Firm* — Scully, Scott, Murphy & Presser, PC

(57) ABSTRACT

An image processing apparatus is provided. The image processing apparatus includes, a transport unit configured to transport a sheet, an access unit configured to access a storage medium attached to the sheet transported by the transport unit, a determination unit configured to determine whether access by the access unit is normally completed, and a change unit configured to, when the determination unit determines that access is not normally completed, change control to the transport unit such that a passing time during which a sheet transported by the transport unit passes an access range of the access unit increases.

18 Claims, 8 Drawing Sheets

IMAGE PROCESSING APPARATUS

CROSS-REFERENCE TO RELATED APPLICATION

This application claims priority from Japanese Patent Application No. 2009-034976, filed on Feb. 18, 2009, the entire subject matter of which is incorporated herein by reference.

TECHNICAL FIELD

Aspects of the present invention relate to an image processing apparatus capable of accessing a storage medium such as a Radio Frequency Identification (RFID) tag or the like.

BACKGROUND

A sheet attached with an RFID tag (hereinafter, referred to as "RFID sheet") has been provided. An image processing apparatus which uses an RFID sheet includes an access device capable of accessing an RFID tag, that is, capable of reading information from an RFID tag or writing information to the RFID tag, and accesses the RFID tag while the RFID sheet is being transported during image forming process.

In the image processing apparatus capable of accessing the RFID tag, it can be considered that reading and writing on a RFID tag fails. Therefore, for example, in a related-art image forming apparatus including a reader/writer for reading and writing on a non-contact IC chip, when reading or writing on the non-contact IC chip cannot be successfully performed, the sheet is reversed and fed again.

However, in the related-art image processing apparatus, even when the RFID sheet is fed again and reading or writing is tried, the reading or writing cannot always be successfully performed. For example, in a case where an access error occurs due to a large amount of data processing being accompanied by processing delay, even when reading or writing is retried under the same condition, it is expected that an error occurs again.

SUMMARY

Accordingly, it is an aspect of the present invention to provide an image processing apparatus capable of reducing an access error to a storage medium.

According to an exemplary embodiment of the present invention, there is provided an image processing apparatus comprising: a transport unit configured to transport a sheet; an access unit configured to access a storage medium attached to the sheet transported by the transport unit; a determination unit configured to determine whether access by the access unit is normally completed; and a change unit configured to, when it is determined that access is not normally completed, change control to the transport unit such that a passing time during which a sheet transported by the transport unit passes an access range of the access unit increases.

According to another exemplary embodiment of the present invention, there is provided an image processing apparatus comprising: an access unit configured to access a storage medium attached to a sheet in an access range; a transport unit configured to transport a sheet to pass through the access range; and a controller connected to the access unit and the transport unit, and configured to control the access unit and the transport unit. If the controller determines that the access unit fails to access the storage medium, the controller controls the transport unit to increase a passing time in which the sheet passes the access range of the access unit. If the controller determines that the access unit succeeds in accessing the storage medium, the control controls the transport unit to leave the passing time unchanged.

According to the above configuration, it is possible to realize an image processing apparatus capable of reducing an access error.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Hereinafter, an image processing apparatus according to exemplary embodiments of the present invention will be described in detail with reference to the accompanying drawings. In the exemplary embodiments, a multi-function peripheral (MFP) having a function for accessing an RFID tag will be described as an example of the image processing apparatus.

[Overall Configuration of MFP]

Figure 1:
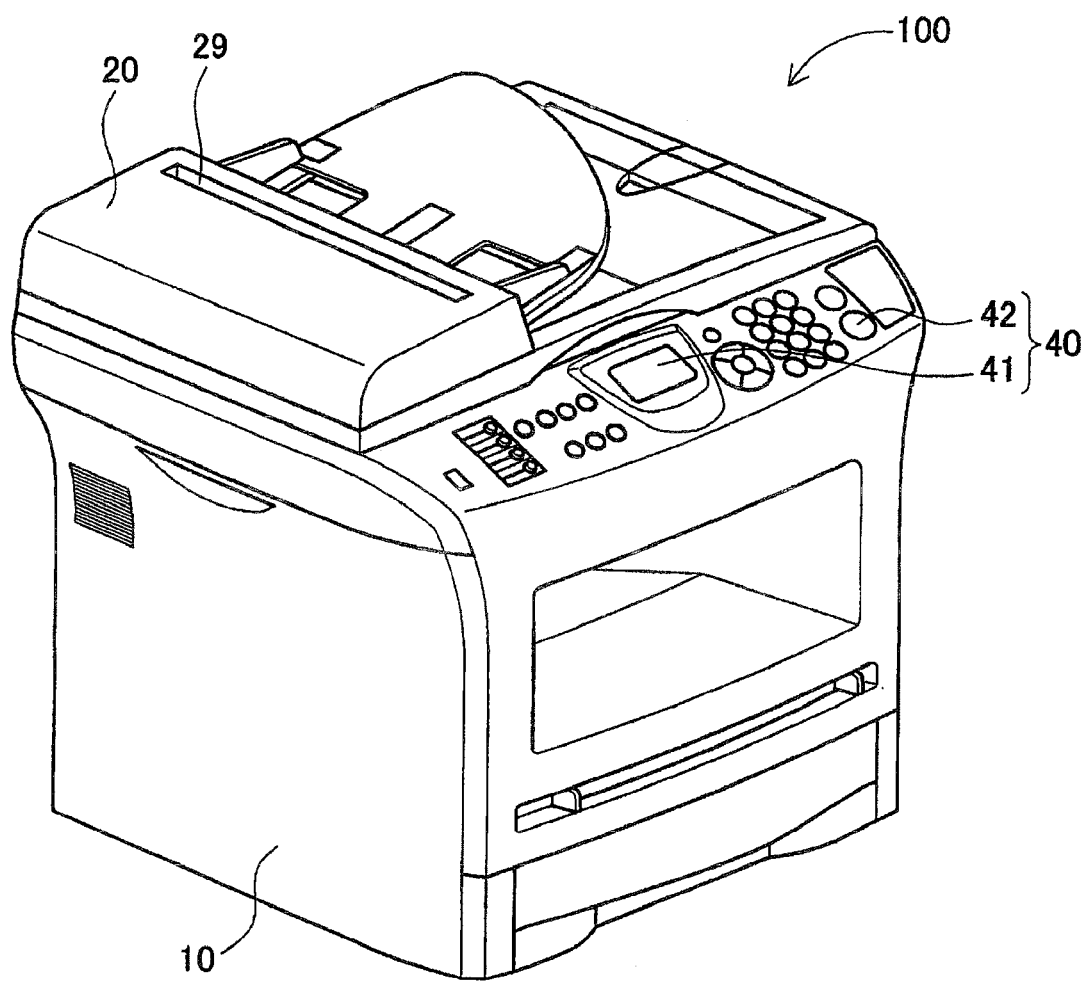
FIG. 1 is a perspective view showing the schematic configuration of a multi-function peripheral according to an exemplary embodiment of the present invention.

As shown in FIG. 1, an MFP 100 according to this exemplary embodiment includes an image forming unit 10 which prints an image on a sheet, and an image reading unit 20 which reads an image of an original document. An operation panel 40 is provided in front of the image reading unit 20. The operation panel 40 includes a display unit 41 having a liquid crystal display, and a button group 42 having a start key, a stop key, a numeric key, and the like. An operation status is displayed on the operation panel 40 and an operation of a user is input through the operation panel 40.

[Configuration of Image Reading Unit]

Figure 2:
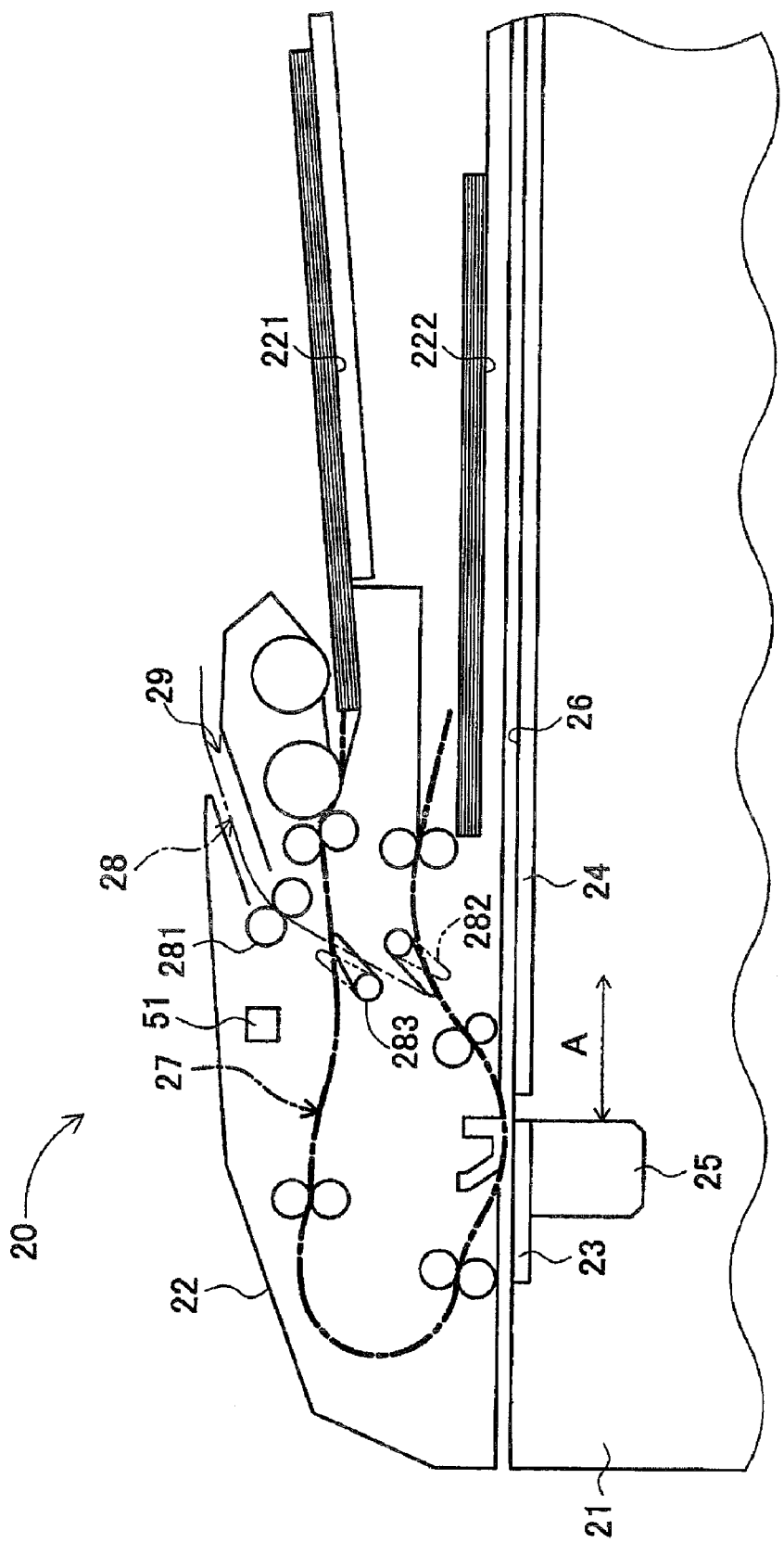
FIG. 2 is a diagram showing the schematic configuration of an image reading unit in the multi-function peripheral according to the exemplary embodiment.

The image reading unit 20 reads an original document and creates image data. Specifically, as shown in FIG. 2, the image reading unit 20 according to this exemplary embodiment includes a scanner unit 21 which reads an image of an original document, and an Automatic Document Feeder (ADF) 22 which automatically transports the original document. The scanner unit 21 includes transparent platen glasses 23 and 24 disposed at the top surface thereof, and an image sensor 25 provided therein.

The ADF 22 includes an original document tray 221 on which an original document before being read placed, and a discharge tray 222 on which the original document after being read is placed. The ADF 22 picks up the original document placed on the original document tray 221 one-by-one, and after the original document is read, discharges the original document onto the discharge tray 222. The ADF 22 also functions as an original document pressing cover which openably covers the upper part of the scanner unit 21 and when an original document is placed on an original document placing plate 26 including the platen glass 24, presses the original document.

As a reading method of an original document, there is provided a flatbed (original document fixed scanning) method and an ADF (original document movable scanning) method. In the case of the flatbed method, an original document is placed on the platen glass 24 (hereinafter, referred to as "FB glass 24") one-by-one. In this state, the image sensor 25 moves in a sub-scanning direction indicated by an arrow A of FIG. 2 (a direction orthogonal to a main scanning direction), and an image of the original document is read in the main scanning direction line-by-line. In the case of the ADF method, an original document is placed on the original document tray 221. Then, the image sensor 25 moves to a position opposing the platen glass 23 (hereinafter, referred to as "ADF glass 23") and is stopped. In this state, the original document is transported to a position (read position) opposing the ADF glass 23, and an image of the original document is read in the main scanning direction line-by-line.

Next, the ADF 22 will be described in detail. A transport path 27 having a substantially U-shape is provided inside the ADF 22. The transport path 27 connects the original document tray 221 and the discharge tray 222. There is provided various rollers along the transport path 27. Specifically, the transport path 27 is configured such that an original document is fed from the original document tray 221 to the ADF 22, U-turned through the various rollers, and transported toward the discharge tray 222 through the ADF glass 23. When the original document passes through the ADF glass 23, an image of the original document is read by the image sensor 25.

A double-face reading mechanism is provided in the ADF 22. The double-face reading mechanism is for reading images on both faces of the original document. A transport path 28 is provided so that, after one face of the original document is read, the original document is reversed and transported again so as to read the image of the other face of the original document. A slit 29 is provided in a case of the ADF 22 for exposing a part of the original document outside the ADF 22 and reversing the original document. Specifically, a switchback roller 281, a first guide flap 282, and a second guide flap 283 are provided inside the ADF 22 so as to form the transport path 28. That is, the transport path 28 extends from the first guide flap 282 toward the switchback roller 281 through the second guide flap 283.

The ADF 22 includes a read/write device 51 (hereinafter, referred to as "R/W device 51") which detects an RFID tag within a predetermined range and is capable of reading and writing data from and to the RFID tag within the predetermined range. The R/W device 51 is provided within a range capable of accessing to an RFID tag attached to an original document passing through the sheet transport path 27. In other words, a part of the sheet transport path 27 is included in the access range of the R/W device 51.

[Configuration of Image Forming Unit]

Figure 3:
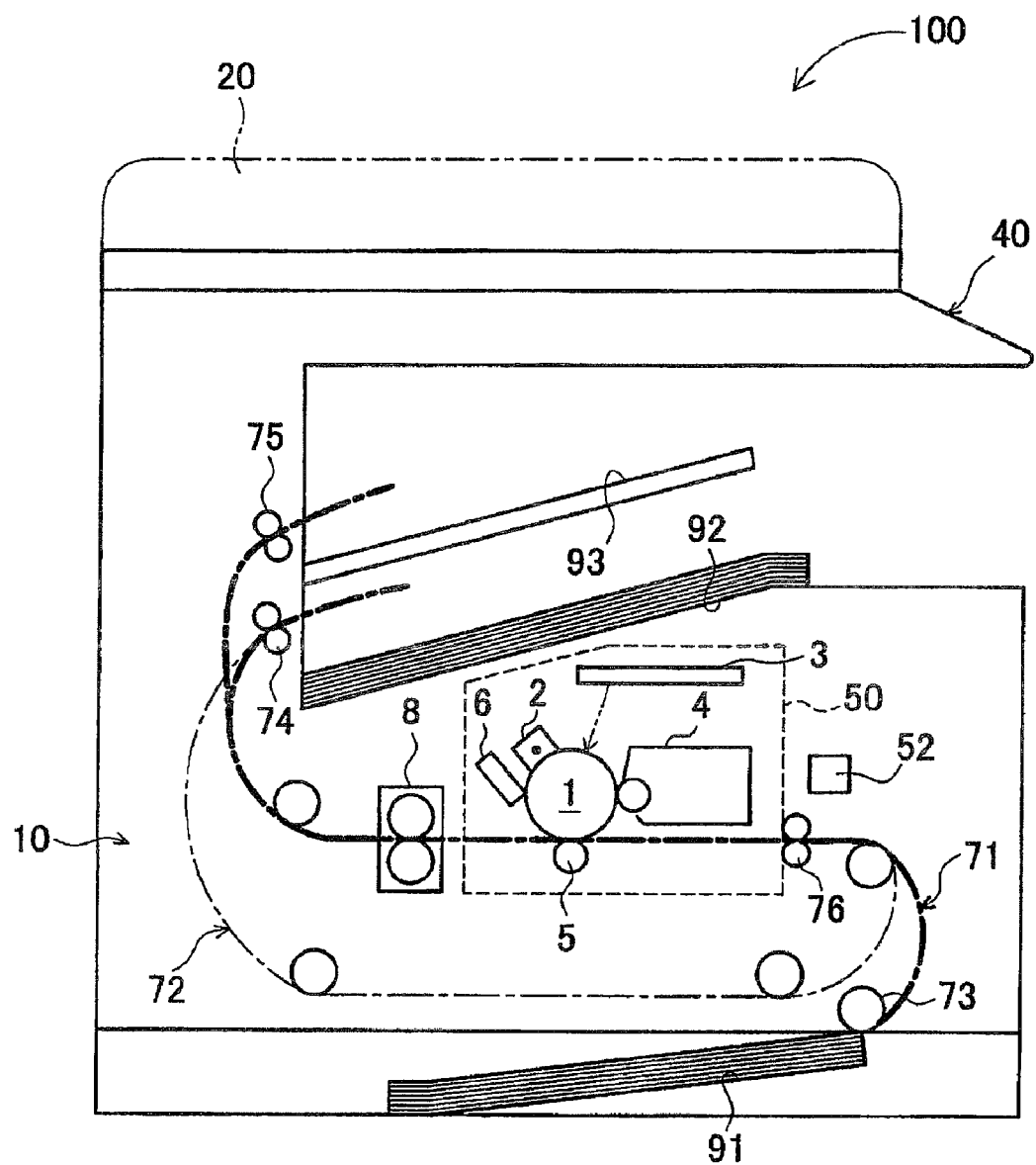
FIG. 3 is a diagram showing the schematic configuration of an image forming unit in the multi-function peripheral according to the exemplary embodiment.

The image forming unit 10 generates an image based on image data transmitted from an information terminal apparatus, such as a personal computer (PC) or the like, or image data of an original document read by the image reading unit 20, and transfers the generated image to a sheet. The image forming unit 10 according to this exemplary embodiment forms an image by a related-art electrophotographic method. As shown in FIG. 3, the image forming unit 10 includes a process unit 50 which forms a toner image, a fixing device 8 which fixes an unfixed toner image, a sheet feed cassette 91 on which sheets before image formation are placed, and discharge trays 92 and 93 on which sheets after image formation are discharged.

The image forming unit 10 includes a transport path 71 having a substantially S-shape which is provided such that a sheet in the sheet feed cassette 91 at the bottom passes through a sheet feed roller 73, a registration roller 76, the process unit 50, and the fixing device 8, and is guided to the upper sheet discharge tray 92 through a sheet discharge roller 74 or to the sheet discharge tray 93 through a sheet discharge roller 75. That is, the image forming unit 10 picks up the sheet placed on the sheet feed cassette 91 one-by-one, transports the sheet to the process unit 50, and transfers a toner image formed in the process unit 50 to the sheet. The sheet to which the toner image is transferred is transported to the fixing device 8, so that the toner image is thermally fixed to the sheet, and thereafter, the sheet is discharged to the sheet discharge tray 92 or the sheet discharge tray 93.

The process unit 50 includes a photosensitive member 1, a charging device 2 which uniformly charges the surface of the photosensitive member 1, an exposure device 3 which exposes the surface of the photosensitive member 1 to light so as to form an electrostatic latent image, a developing device 4 which develops the electrostatic latent image by toner, a transfer device 5 which transfers the toner image on the photosensitive member 1 to a sheet, and a cleaning blade 6 which removes residual toner on the photosensitive member 1.

In the process unit 50, the charging device 2 uniformly charges the surface of the photosensitive member 1. Thereafter, exposure is performed by light from the exposure device 3, and an electrostatic latent image of an image to be formed on the sheet is formed. Next, the developing device 4 supplies toner to the photosensitive member 1. Accordingly, the electrostatic latent image on the photosensitive member 1 is visualized as a toner image.

The image forming unit 10 further includes a double-face print mechanism for printing on both faces of a sheet. A transport path 72 is provided so that, after printing is performed on one face of a sheet, the sheet is reversed and transported again to the process unit 50 for printing on the other face of the sheet.

The image forming unit 10 further includes an R/W device 52 which detects an RFID tag within a predetermined range and is capable of reading and writing data from and to the RFID tag within the predetermined range. The R/W device 52 is provided within a range capable of accessing an RFID tag of an RFID sheet passing through the transport path 71. In other words, a part of the transport path 71 is included in the access range of the R/W device 52.

[Electrical Configuration of MFP]

Figure 4:
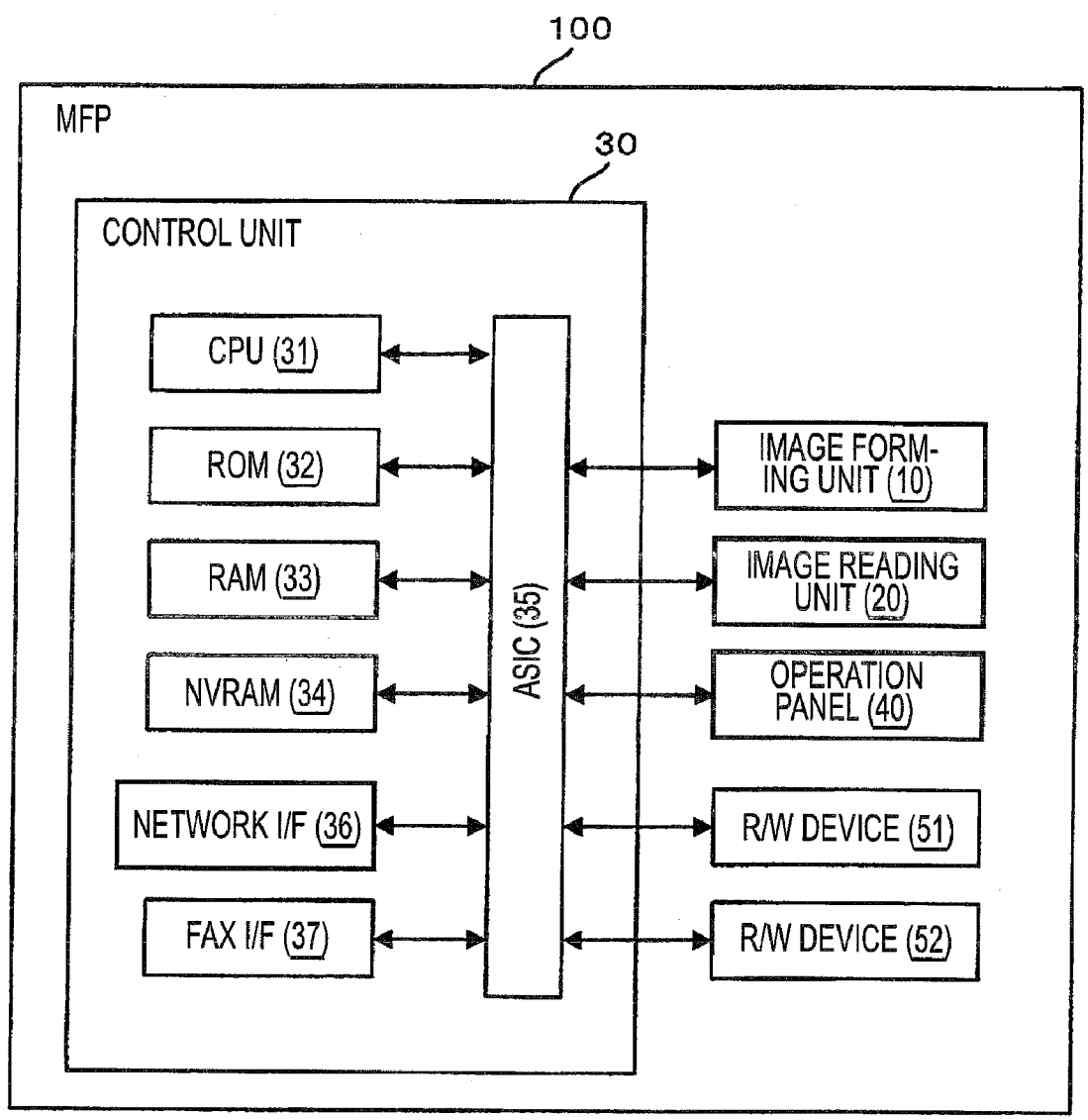
FIG. 4 is a block diagram showing the electrical configuration of the multi-function peripheral according to the exemplary embodiment.

Subsequently, the electrical configuration of the MFP 100 will be described. As shown in FIG. 4, the MFP 100 includes a control unit 30 which includes a Central Processing Unit (CPU) 31, a Read Only Memory (ROM) 32, a Random Access Memory (RAM) 33, a Non-Volatile RAM (NVRAM) 34, an Application Specific Integrated Circuit (ASIC) 35, a network interface 36, and a FAX interface 37.

The CPU 31 executes an arithmetic operation for realizing various functions, such as an image reading function, an image forming function, and the like, in the MFP 100 to act as a control center. The ROM 32 stores various control programs or settings for controlling the MFP 100, initial values, and the like. The RAM 33 is a work area where various control programs are read, or used as a storage area where image data is temporarily stored. The NVRAM 34 is a nonvolatile storage unit and is used as a storage area where various settings and image data are stored.

The CPU 31 controls the respective constituent elements of the MFP 100 (for example, lighting timing of the exposure device constituting the image forming unit 10, drive motors (not shown) of various rollers forming the sheet transport path, and a motor for movement (not shown) of the image sensor unit constituting the image reading unit 20) in accordance with control programs read from the ROM 32 or signals transmitted from various sensors through the ASIC 35 while storing processing results in the RAM 33 or the NVRAM 34.

The network interface 36 is connected to a network, such as Internet or the like, and enables connection to an image processing apparatus, such as a PC or the like. The FAX interface 37 is connected to a telephone line, and enables connection to a FAX device of the other party. A job can be exchanged through the network interface 36 or the FAX interface 37.

[Write and Print Processing]

Figure 5:
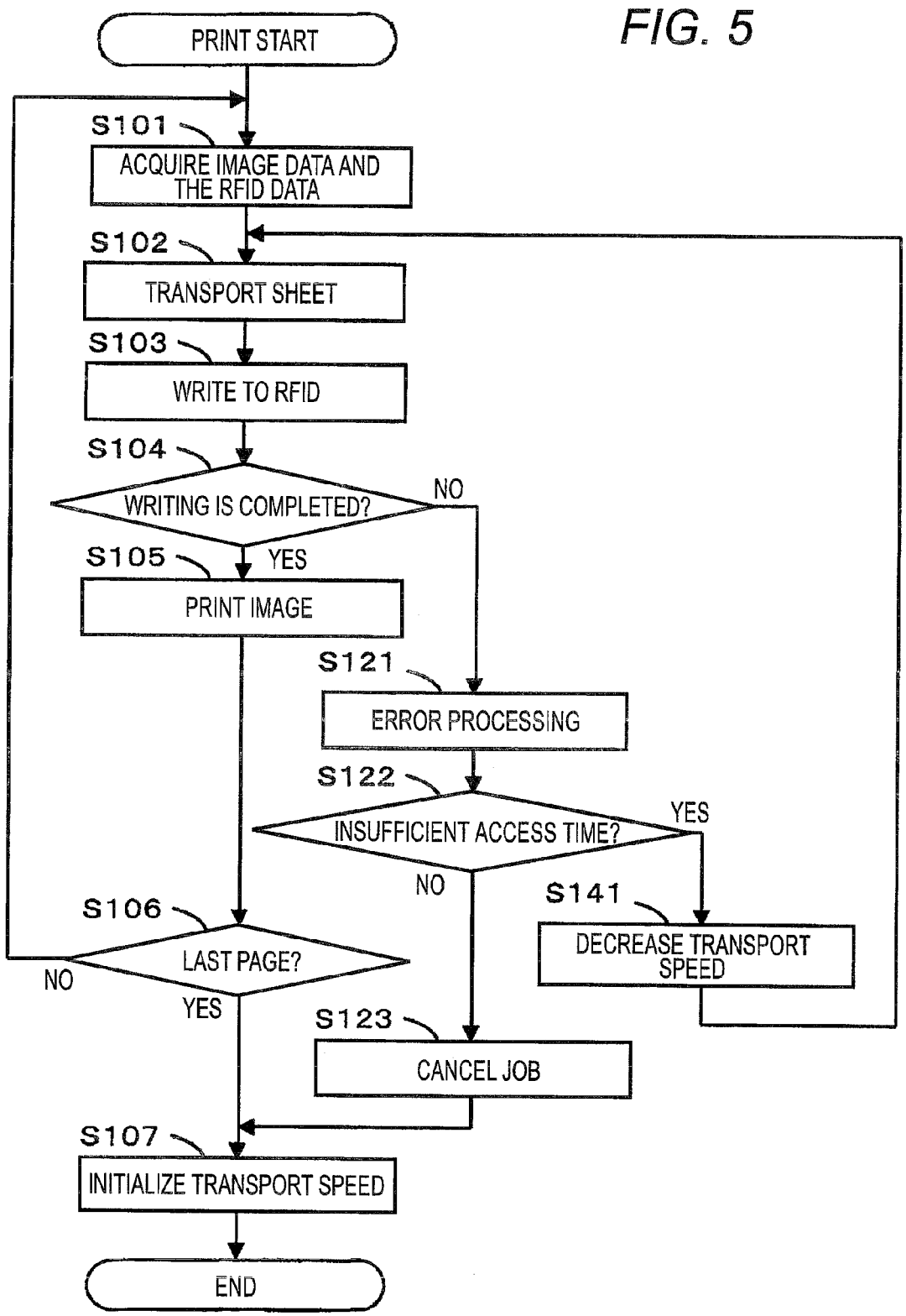
FIG. 5 is a flowchart showing operations of a write and print processing.

Subsequently, write and print processing in the MFP 100 will be described with reference to a flowchart of FIG. 5. During this write and print processing, in addition to image formation on a sheet, data is written to the RFID tag attached to the sheet. This processing is started in response to a print instruction.

First, image data of a first page and data to be written to an RFID tag for a job related to the print instruction are acquired (S101). Image data may be read by the scanner unit 21 of the image reading unit 20, or may be transmitted from a PC or the like. Data to be written to the RFID tag may be read by the R/W device 51 of the image reading unit 20, or may be transmitted from a PC or the like.

If the image data and the data to be written to the RFID tag are acquired, one RFID sheet is fed from the sheet feed cassette 91, and the RFID sheet is transported in the transport path 71 (S102). When the RFID sheet starts to be transported, an access permission signal is transmitted from the R/W device 52, and if the RFID sheet enters the access range of the R/W device 52, the RFID tag attached to the RFID sheet transmits a response signal to the access permission signal. In response to receiving the response signal, the R/W device 52 starts writing data to the RFID tag (S103).

Next, it is determined whether writing of all of data is completed (S104). In other words, it is determined whether writing of data is normally completed or it is determined whether the R/W device 52 succeeds in writing of data. The determination of writing completion is made, for example, based on whether a completion signal transmitted from the RFID tag when writing is completed is received. When it is determined that writing is not completed, or failed (S104: NO), the process proceeds to S121 and error processing is performed (S121). During the error processing, an operation is performed for notifying the user that writing to the RFID tag has failed.

Figure 6:
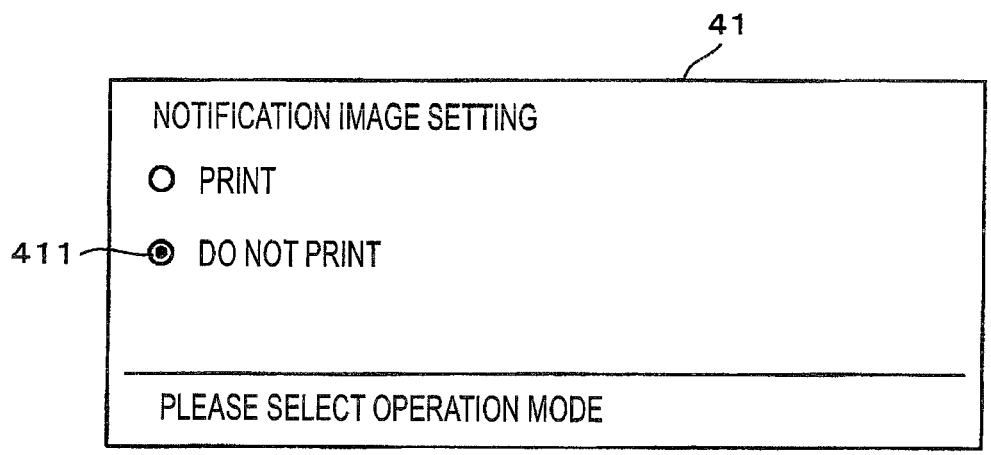
FIG. 6 is a diagram showing an example of a setting screen of a notification image when the write and print processing is performed.
Figure 7:
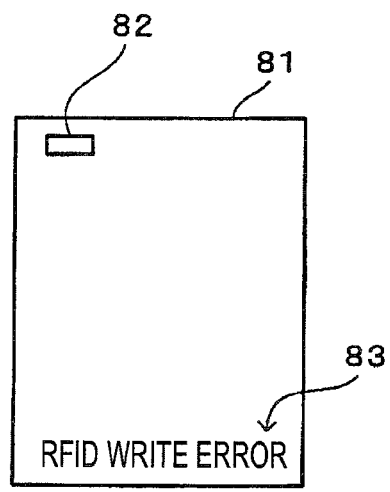
FIG. 7 is a diagram showing an image regarding an operation mode in which a notification character string is printed on an RFID sheet.
Figure 8:
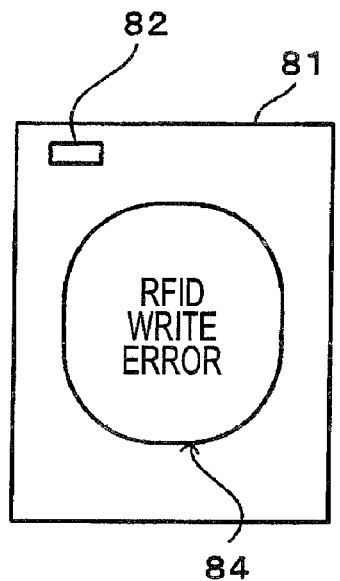
FIG. 8 is a diagram showing an image regarding an operation mode in which a notification mark is printed on an RFID sheet.

In this exemplary embodiment, as the error processing in S121, the following two kinds of processing may be performed. The first processing includes forming a notification image. In the MFP 100, a setting screen shown in FIG. 6 is displayed on the display unit 41 of the operation panel 40 to allow the user to select whether to print a notification image. If the user selects to print by a radio button 411, a notification image print setting is set. As a mode of the notification image, as shown in FIG. 7, a character string 83 indicating that writing to an RFID tag 82 has failed is printed on an RFID sheet 81. As shown in FIG. 8, a mark 84 indicating that writing to the RFID tag 82 has failed may be printed at the center of the RFID sheet 81. The user can view the notification image to recognize that writing to the RFID tag has failed.

Figure 9:
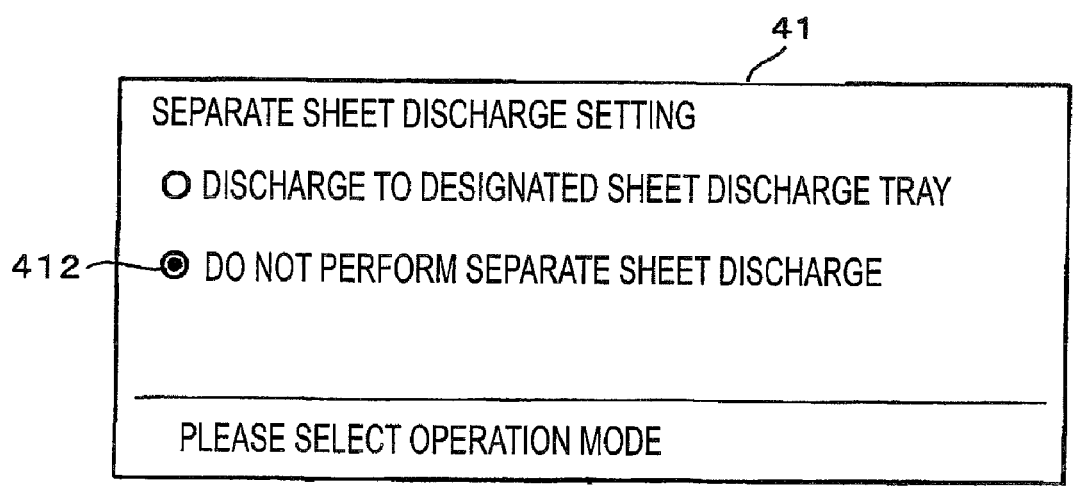
FIG. 9 is a diagram showing an example of a setting screen of separate sheet discharge when the write and print processing is performed.

The second processing includes separately discharging an RFID sheet for which writing to an RFID tag has failed and an RFID sheet for which writing has been normally completed. In the MFP 100, a setting screen shown in FIG. 9 is displayed on the display unit 41 of the operation panel 40 to allow the user to select whether to discharge a sheet to a sheet discharge tray (a designated sheet discharge tray) different from normal sheet discharge. If the user selects to discharge a sheet to the designated sheet discharge tray by a radio button 412, a separate sheet discharge setting is set. A sheet discharge tray that becomes the designated sheet discharge tray is set on a setting screen of the designated sheet discharge tray. For example, in the MFP 100, one of the sheet discharge trays 92 and 93 becomes the sheet discharge tray (designated sheet discharge tray) when writing to an RFID tag has failed, and the other sheet discharge tray becomes a sheet discharge tray when writing to an RFID tag is successful. In this way, a sheet for which writing is normally completed and a sheet for which an error occurs are separated at the time of sheet discharge, so the user can recognize a sheet for which writing to an RFID tag has failed.

After the error processing in S121 is performed, it is determined whether the cause why writing is not completed is that an access time period required for access completion from a time when access to an RFID tag is started is insufficient (S122). The determination of insufficient access time is made based on whether a completion signal transmitted from an RFID tag is received within a predetermined time. For example, when a communication error occurs, an error signal transmitted from an RFID tag may be received. Further, when an RFID tag is out of order, there is no response to a write permission signal from the beginning. For this reason, it is possible to distinguish between insufficient access time and other errors.

When it is determined that the cause is insufficient access time (S122: YES), the sheet transport speed is delayed (S141). That is, sheet transport control is changed such that a passing time during which an RFID sheet passes through the access range of the R/W device 52 increases. For example, control is performed such that the passing time increases by 20% longer than the previous setting. After the control change, the process returns to S102, a next sheet is transported, and data which is failed to be written is written again. That is, in a state where the transport speed is delayed, write processing is retried for an RFID sheet newly transported. When writing is retried, the passing time is extended as compared with the previous writing, so there is a high probability that writing will be completed.

When it is determined that the cause is insufficient RFID tag capacity, communication failure, or RFID tag breakage other than insufficient access time (S122: NO), the job is cancelled (S123). Then, since the transport control has been changed in S141, the transport control is initialized (S107), and this processing ends.

Returning to the description of S104, when writing is normally completed or succeeded (S104: YES), the image acquired in S101 is printed (S105). In this case, the sheet transport control is left unchanged. Thereafter, it is determined whether or not a last page is printed (S106). When the last page is not printed (S106: NO), the process returns to S101, and an image of a next page and data to be written to an RFID tag are acquired. When the last page is printed (S106: YES), the transport control is initialized (S107), and this processing ends.

As described above, in the write and print processing of the MFP 100 according to this exemplary embodiment, when writing to an RFID tag is not normally completed, the transport control is changed such that the transport speed is delayed, and the passing time during which the RFID sheet passes through the access range of the R/W device 52 is extended. Therefore, for a subsequent RFID sheet, the time for which R/W device 52 is capable of accessing an RFID tag is extended, so repetition of access failure due to processing delay can be reduced.

In the write and print processing, the changed transport speed continues within the same job. In other words, once the sheet transport control is changed, the sheet transport control is maintained to be changed without returning to a previous control until the job ends. That is, access of the same quantity of data tends to continue. If the transport control is quickly returned during the same job, an error is likely to occur again. For this reason, it may be advantageous that control after change continues within the same job.

In the write and print processing, when an error occurs due to insufficient access time after the transport speed is once delayed, the transport speed is delayed such that the passing time further increases. That is, an error may not be always eliminated with a single change. Accordingly, control change is performed repeatedly, so that repetition of access failure can be more reliably reduced.

In the write and print processing, when an error occurs due to insufficient access time, an image that is to be formed on an RFID sheet for which the error occurs is formed on a subsequent RFID sheet. That is, an RFID sheet (preceding sheet) for which an error occurs is insufficient in writing to an RFID tag and is not that desired by the user. Accordingly, an image of the preceding sheet is formed on a subsequent sheet for which writing to an RFID tag is performed again after the transport control is changed, so the user obtains a desired printed matter.

[Read and Scan Processing]

Figure 10:
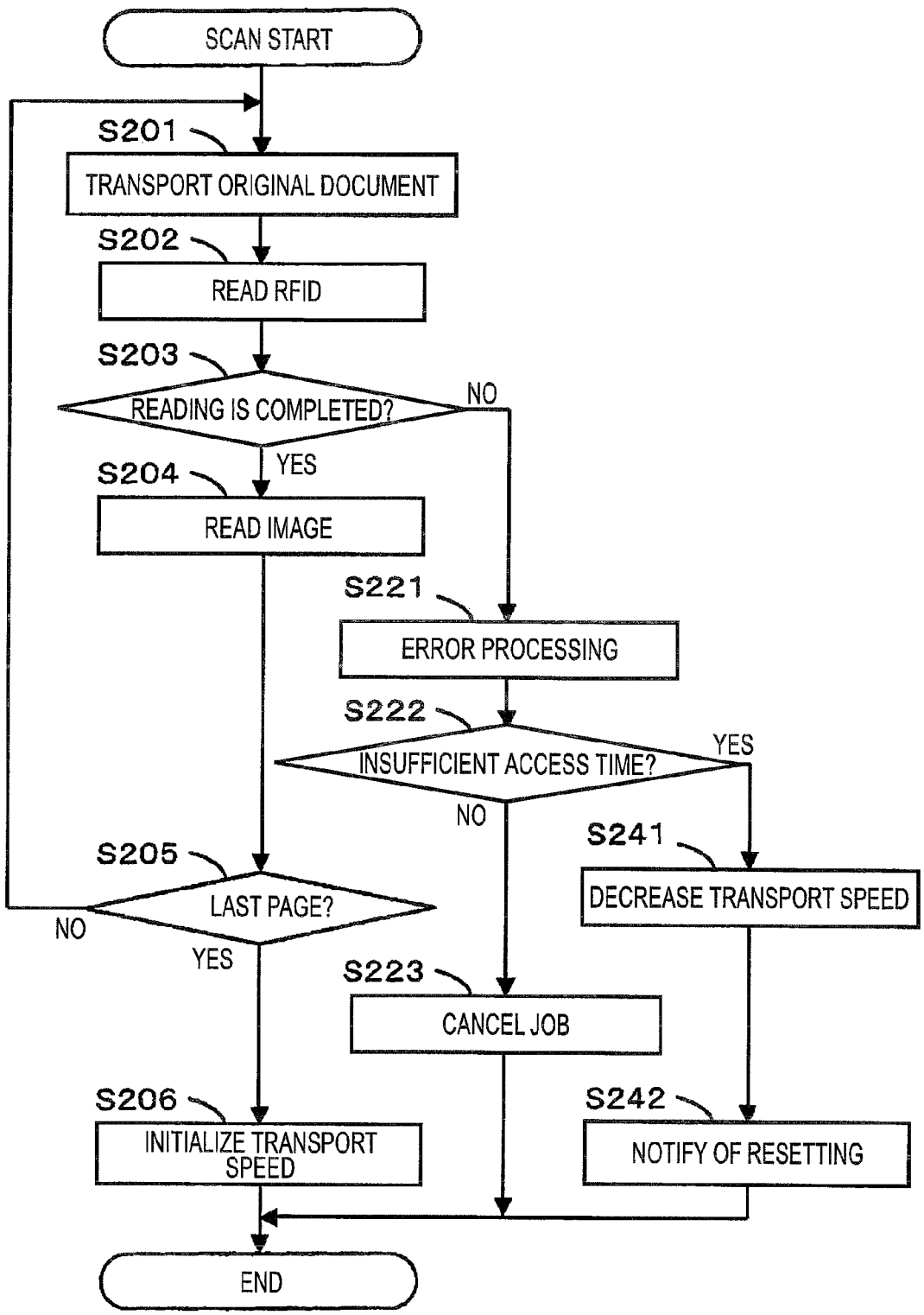
FIG. 10 is a flowchart showing operations of a read and scan processing.

Subsequently, read and scan processing in the MFP 100 according to the exemplary embodiment will be described with reference to a flowchart of FIG. 10. During this read and scan processing, in addition to reading of an original document by an ADF method, data is read from an RFID tag attached to the original document. This processing is started in response to a read instruction.

First, one sheet of an original document attached with an RFID tag (hereinafter, referred to as "RFID original document") placed on the original document tray 221 is picked up, and the RFID original document is transported onto the transport path 27 (S201). If the RFID original document starts to be transported, an access permission signal is transmitted from the R/W device 51, and if the RFID original document enters the access range of the R/W device 51, the RFID tag transmits a response signal to the access permission signal. In response to receiving the response signal, the R/W device 51 starts reading data from the RFID tag (S202).

Next, it is determined whether reading of all of data is completed (S203). In other words, it is determined whether reading of data is normally completed or it is determined whether the R/W device 51 succeeds in reading of data. When it is determined that reading is not completed or failed (S203: NO), the process proceeds to S221, and an error processing is performed (S221). During this error processing, an operation is performed for notifying the user that reading from the RFID tag has failed.

In this exemplary embodiment, as the error processing in S221, a warning beep is generated or an error message is displayed on the display unit 41 of the operation panel 40. Various settings are made through operations of the operation panel 40. When the ADF 22 includes a plurality of sheet discharge trays, separate sheet discharge may be performed by a separating mechanism (not shown) similarly to the separate sheet discharge in the write and print processing.

After the error processing in S221 is performed, it is determined whether the cause why reading is not completed is that an access time period during required for access completion from a time when access to an RFID tag starts is insufficient (S222). The determination of insufficient access time is made based on whether a completion signal transmitted from the RFID tag is received within a predetermined time.

When it is determined that the cause is insufficient access time (S222: YES), the transport speed of the original document is delayed (S241). That is, the transport control of the original document is changed such that a passing time during which the RFID original document passes through the access range of the R/W device 51 increases. The MFP 100 stores control change, displays a message for requesting the user to reset the original document on the display unit 41 of the operation panel 40 (S242), and ends this processing. Thereafter, the user resets the original document on the original document tray 221 and inputs a read instruction for the read and scan processing again. Thus, the read and scan processing can be retried while the transport speed is delayed. When the read and scan processing is retried, the passing time is extended as compared with the previous reading, so there is a high probability that reading will be completed.

When it is determined that the cause is other than insufficient access time (S222: NO), the job is cancelled (S223), and this processing ends.

Returning to the description of S203, when reading is normally completed or succeeded (S203: YES), the image of the original document is read (S204). In this case, the transport control of the original document is left unchanged. Thereafter, it is determined whether a last page is read (S205). When the last page is not read (S205: NO), the process returns to S201, and a next page starts to be transported. When the last page is read (S205: YES), the transport control is initialized (S206), and this processing ends.

As described above, in the read and scan processing of the MFP 100 according to this exemplary embodiment, when reading from an RFID tag is not normally completed, the original document temporarily stops being transported, the transport control is changed such that the transport speed is delayed, and the passing time during which the RFID original document passes through the access range of the R/W device 51 is extended. Therefore, for a subsequent RFID original document, the time for which the R/W device 51 is capable of accessing an RFID tag is extended, so repetition of access failure due to processing delay can be reduced.

While the present invention has been shown and described with reference to certain exemplary embodiments thereof, it will be understood by those skilled in the art that various changes in form and details may be made therein without departing from the spirit and scope of the invention as defined by the appended claims.

For example, the present invention is not limited to a multi-function peripheral (MFP) but may be applied to a copy machine, a scanner, a FAX machine, or the like as long as it has an image processing function. The image forming method of the image forming unit is not limited to an electrophotographic method, but an ink jet method may be used. The present invention may be applied to an image forming apparatus which forms a color image or an image forming apparatus which only forms a monochrome image.

In the above-described exemplary embodiment, although the image reading unit 20 and the image forming unit 10 can perform image reading and image formation on both faces together, the present invention is not limited thereto. That is, the present invention may be applied to an apparatus which supports image reading and image formation only on a single face.

In the above-described exemplary embodiment, although a combination of image formation and RFID tag writing or a combination of original document reading and RFID tag reading has been described, the present invention may be applied to a combination of image formation and RFID tag reading or a combination of original document reading and RFID tag writing.

In the above-described exemplary embodiment, the sheet transport speed is decreased so as to increase the sheet passing time in the write and print processing, the present invention is not limited thereto. For example, similarly to the image forming unit 10 of the above-described exemplary embodiment, in the case that a sheet is temporarily stopped at the registration roller 76 so as to adjust the transport timing of the sheet, the stop time at the registration roller 76 may be extended. In this case, the stop position at the registration roller 76 is included in the access range of the R/W device 52.

In the above-described exemplary embodiment, sheets are discharged to different sheet discharge trays at the time of separate discharge, the present invention is not limited thereto. For example, in the case of an apparatus having an offset sheet discharge mechanism for discharging a sheet to be slightly shifted from sheets discharged at the time of normal printing within the same sheet discharge tray, offset sheet discharge may be performed as separate sheet discharge.

In the above-described exemplary embodiment, image formation on a sheet is performed after writing on an RFID tag, the sequence may be reversed. Further, writing on an RFID tag and image formation on a sheet may be performed in parallel.

What is claimed is:

1. An image processing apparatus comprising:
    a transport unit configured to transport a sheet;
    an access unit configured to access a storage medium attached to the sheet transported by the transport unit;
    a first determination unit configured to determine whether access by the access unit is normally completed; and
    a change unit configured to, when the first determination unit determines that access is not normally completed, change control to the transport unit such that a passing time during which a sheet transported by the transport unit passes an access range of the access unit increases.

2. The image processing apparatus according to claim 1, wherein when the first determination unit determines that access is normally completed, the change unit leaves the control to the transport unit unchanged.

3. The image processing apparatus according to claim 1, further comprising:
    a second determination unit configured to determine, when the first determination unit determines that access is not normally completed, whether a cause of the abnormal completion of access by the access unit is that an access time period required for access completion from a time when access is started by the access unit is insufficient,
    wherein the change unit changes the control to the transport unit based on the determination by the cause determination unit.

4. The image processing apparatus according to claim 3, wherein the change unit changes the control to the transport unit when the second determination unit determines that the cause of the abnormal completion is that the access time period is insufficient, and leaves the control to the transport unit unchanged when the second determination unit determines that the cause of the abnormal completion is not that the access time period is insufficient.

5. The image processing apparatus according to claim 1, wherein, during processing of a job, once the change unit changes the control to the transport unit, the change unit maintains the control to the transport unit being changed without returning to a previous control until the job ends.

6. The image processing apparatus according to claim 1, wherein, during processing of a job on a plurality of sheets, once the change unit changes the control to the transport unit, the change unit maintains the control to the transport unit being changed until the processing on a last sheet of the plurality of sheets ends.

7. The image processing apparatus according to claim 1, wherein, when the first determination unit determines that the access is not normally completed again after changing the control to the transport unit, the change unit changes the control to the transport unit such that the passing time increases further.

8. The image processing apparatus according to claim 1, further comprising:
    an image forming unit configured to form an image on a sheet transported by the transport unit,
    wherein the access unit has a function of writing data to the storage medium, and
    wherein when the first determination unit determines that access is not normally completed, the image forming unit forms an image to be formed on a sheet for which the first determination unit determines that access is not normally completed, on a subsequent sheet.

9. The image processing apparatus according to claim 1, further comprising:
    an image forming unit configured to form an image on a sheet transported by the transport unit,
    wherein when the first determination unit determines that access is not normally completed, the image forming unit forms a notification image indicating that access is not normally completed, on a sheet for which the first determination unit determines that access is not normally completed.

10. The image processing apparatus according to claim 1, further comprising:
    a sheet discharge unit configured to separately discharge a sheet for which the first determination unit determines that access is not normally completed and a sheet for which the first determination unit determines that access is normally completed.

11. The image processing apparatus according to claim 1, wherein the first determination unit determines whether access by the access unit is normally completed based on whether the access unit receives a completion signal from the storage medium attached to the sheet to be transmitted when writing is completed.

12. The image processing apparatus according to claim 3, wherein the second determination unit determines whether a cause of the abnormal completion is that the access time period is insufficient based on whether the access unit receives an error signal after receiving a write permission signal from the storage medium attached to the sheet at start of access.

13. The image processing apparatus according to claim 1, wherein the change unit controls the transport unit to decrease a transport speed of the sheet when the first determination unit determines that the access is not normally completed.

14. The image processing apparatus according to claim 1, wherein the transport unit is configured such that a sheet is stopped at a predetermined position to adjust a transport timing of the sheet,
wherein the predetermined position is provided within the access range of the access unit, and
wherein the change unit controls the transport unit to stop the sheet at the predetermined position longer when the first determination unit determines that the access is not normally completed.

15. An image processing apparatus comprising:
an access unit configured to access a storage medium attached to a sheet in an access range;
a transport unit configured to transport a sheet to pass through the access range; and
a controller connected to the access unit and the transport unit, and configured to control the access unit and the transport unit,
wherein if the controller determines that the access unit fails to access the storage medium, the controller controls the transport unit to increase a passing time in which the sheet passes the access range of the access unit,
wherein if the controller determines that the access unit succeeds in accessing the storage medium, the controller controls the transport unit to leave the passing time unchanged.

16. The image processing apparatus according to claim 15, wherein if the controller increases the passing time to an increased value during processing a job, the passing time is maintained at the increased value until the processing on the job ends.

17. The image processing apparatus according to claim 15, wherein if the controller determines that the access unit fails to access the storage medium again after the controller increases the passing time, the controller increases the passing time further.

18. The image processing apparatus according to claim 15, further comprising:
an image forming unit configured to form an image on a sheet,
wherein the controller is further connected to the image forming unit, and
wherein if the controller determines that the access unit fails to access a storage medium attached to a sheet, the controller controls the image forming unit to form an image to be formed on the sheet for which the controller determines that the access unit fails to access, on a subsequent sheet.

* * * * *